United States Patent
Kurth et al.

(10) Patent No.: US 9,593,763 B2
(45) Date of Patent: Mar. 14, 2017

(54) GEARING ASSEMBLY HAVING A PLANETARY STAGE

(71) Applicant: Schaeffler Technologies AG & Co. KG, Herzogenaurach (DE)

(72) Inventors: Franz Kurth, Nuremberg (DE); Andreas Hofmann, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/908,017

(22) PCT Filed: Jun. 30, 2014

(86) PCT No.: PCT/DE2014/200288
§ 371 (c)(1),
(2) Date: Jan. 27, 2016

(87) PCT Pub. No.: WO2015/024564
PCT Pub. Date: Feb. 26, 2015

(65) Prior Publication Data
US 2016/0169372 A1    Jun. 16, 2016

(30) Foreign Application Priority Data
Aug. 23, 2013 (DE) .......................... 10 2013 216 797

(51) Int. Cl.
    *F16H 3/52*        (2006.01)
    *F16H 57/08*      (2006.01)
    *F16H 3/54*        (2006.01)

(52) U.S. Cl.
CPC .............. *F16H 57/082* (2013.01); *F16H 3/54* (2013.01)

(58) Field of Classification Search
CPC ...... F16H 3/48; F16H 3/52; F16H 3/54; F16H 57/082
See application file for complete search history.

(56) References Cited

U.S. PATENT DOCUMENTS

2011/0245012 A1* 10/2011 Biermann ............... F16H 48/10
                                                            475/248
2015/0126322 A1* 5/2015 Biermann ............... F16H 48/11
                                                            475/252

FOREIGN PATENT DOCUMENTS

| DE | 4112330 A1 | 7/1992 | |
|---|---|---|---|
| DE | 102009032286 A1 | 6/2010 | |
| DE | 102011075166 A1 | 11/2012 | |
| DE | WO 2013174553 A1 * | 11/2013 | ............. F16H 48/11 |
| WO | 2010112366 A1 | 10/2010 | |

(Continued)

*Primary Examiner* — Huan Le
(74) *Attorney, Agent, or Firm* — Simpson & Simpson, PLLC

(57) ABSTRACT

A gearing arrangement, comprising a planetary stage comprising a planet carrier arranged to rotate around a transmission shaft, a plurality of planet pins each planet pin comprising respective first and second end regions, planet gears arranged on the planet carrier and seated on the plurality of planet pins, and at least one sun gear, and a spur gear arranged to direct torque into the planet carrier, wherein the planet carrier comprises a cage element axially arranged on the spur gear, and the plurality of planet pins are arranged within the spur gear and radially supported in the cage element with the respective first end regions arranged to face the spur gear and the respective second end regions arranged to face away from the spur gear.

12 Claims, 1 Drawing Sheet

(56) References Cited

FOREIGN PATENT DOCUMENTS

WO      2012132712 A1    10/2012

\* cited by examiner

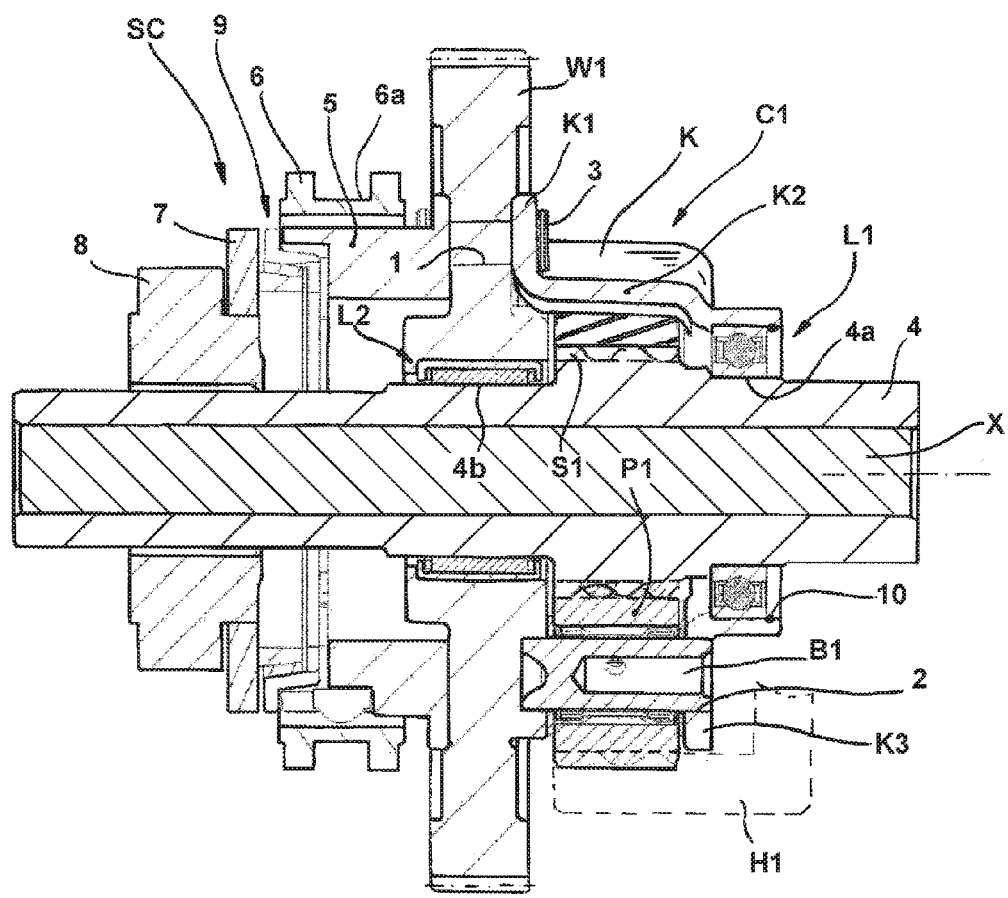

GEARING ASSEMBLY HAVING A PLANETARY STAGE

CROSS-REFERENCE TO RELATED APPLICATIONS

The present application is the U.S. national stage application pursuant to 35 U.S.C. §371 of International Application No. PCT/DE2014/200288, filed Jun. 30, 2014, which application claims priority from German Patent Application No. DE 10 2013 216 797.0, filed Aug. 23, 2013, which applications are incorporated herein by reference in their entireties.

TECHNICAL FIELD

The invention relates to a gearing arrangement with a planetary stage, which as such comprises a planet carrier designed to rotate around a transmission shaft, a sun gear, planet gears, and a spur gear to drive the planet gears.

BACKGROUND

A gearing arrangement with a planetary stage is known from DE 41 12 330 A1. In this case, the planetary stage is integrated into the gearing arrangement in a manner that allows the planet carrier to be coupled with the sun gear or the stationary gearbox housing in a manner capable of being shifted. When the planet carrier is coupled with the sun gear, the planetary stage is intrinsically blocked and the gearbox input is fixed as a result, e.g. coupled to the transmission output without step-up effect. When the planet carrier is engaged on the gearbox housing, the planets housed in the planet carrier function as stationary seated transfer gears that couple the ring gear and the sun gear as a gear assembly with a corresponding step-up ratio. In order to facilitate the selective coupling of the planet carrier with the sun gear shaft or the gearbox housing, the planet carrier is connected with a shifting shaft. The shifting shaft guides an axially displaceable friction or positive locking element that is coupled with the sun gear shaft in the first shifting position and engages with the gearbox housing in the second shifting position.

SUMMARY

Disclosed herein is a gearing arrangement with: a planetary stage, which as such comprises a planet carrier designed to rotate around a transmission shaft, with planet gears arranged in the planet carrier and seated on planet pins; at least one sun gear; and a spur gear to direct a torque into the planet carrier. The planet carrier comprises a cage element fabricated as a formed sheet-metal part and is mounted axially onto the spur gear. The spur gear forms a part of the planet carrier. The planet pins are accommodated in the spur gear in their end region facing the spur gear and are radially supported in the cage element in their end region facing away from the spur gear.

This advantageously allows a compact and durable gearing arrangement to be created on which the drive torque, applied on the spur gear in an advantageous structural-mechanical manner, generates the forces applied on the planet pins and directed in the direction of rotation. The remaining portion of the drive torque applied on the spur gear is directed into the cage element through the fastening elements designed to mate the cage element to the spur gear. The planet pins, designed to seat the planets, are therefore rigidly supported in the direction of rotation on both sides.

In an example embodiment of the invention, the gearing arrangement is configured in a manner where several bores are drilled sequentially in circumferential direction into the spur gear and the planet pins are inserted into these bores from one side. The inside diameters of these bores are, for example, drilled as blind hole bores and are, for example, matched with the outside diameters of the planet pins in a manner to be accommodated in the bores under an interference fit. This achieves a particularly advantageous transfer of forces from the spur gear into the particular planet pin. In an example embodiment, the planet pins are configured in a manner that the planet pins form a continuous cylindrical exterior surface, so that the exterior surface ultimately functions as a bearing or rotational surface for the pins and the seating surface zones located in the spur gear and cage form a smooth transition. The planet pins can be configured as solid pins, or also as at least partially hollow-drilled pins. A lubricant transfer is be achieved through bores that, for example, run in the interior of the planet pins to the bearing location leading to the particular planet gear. In an example embodiment, appropriate lubricant paths are continued in the interior of the spur gear. In an example embodiment, these lubricant paths are implemented as lubricant paths defined between the spur gear and the mated cage. By taking advantage of a pumping effect, this enables the lubrication oil captured within the planet carrier cage to be forced into the lubricant paths and then supplied through the planet pins to the bearing location seating the particular planet.

The cage element also features perforations into which the planet pins are plunged with their particular end region. Here as well, the component dimensions can be matched in a manner that the planet pins are again seated in the cage element under an interference fit. In an example embodiment, the perforations arranged in the cage element to seat the planet pins are fabricated in a punch/press forming operation, to force a plastic material displacement that results in an increased wall thickness at the wrap-around of the perforation on the cage element. In an example embodiment, the perforations are configured in a manner to secure the planet pins in axial direction, therefore preventing the planet pins from traveling out of the planet carrier in axial direction through the cage bottom of the cage element.

In an example embodiment, the gearing arrangement is configured in a manner that the cage element is mated to the spur gear with rivets. In an example embodiment, the rivets are inserted axially through the spur gear thus axially securing the spur gear against the cage element at high strength. In this case, the rivets are, for example, located along a common pitch circle. For example, this involves arranging two adjacent rivets each between two sequential planet gears. In an example embodiment, the diameter of the aforementioned pitch circle on which the rivets are located is defined in a manner that the enveloping radius concentric to the transmission shaft has a smaller diameter than the enveloping radius enclosing the tooth base radius and also concentric to the transmission shaft. This accomplishes that the rivet heads are located radially inside the tip radius of the interior teething of a ring gear positioned onto the planetary arrangement. In an example embodiment, this arrangement concept is implemented in a manner that the outside edge of the rivet heads is located radially as far to the outside as possible, without the rivet heads in this case colliding with the ring gear or other gearbox components as a result. As the diameter of the rivet bore pitch circle increases, so does the strength of the connection of the cage element, as does the torsional rigidity of this connection. The rivet heads are arranged as flat as possible. It is also possible to arrange counter-sunk rivet heads in the flange surface of the cage element.

In an example embodiment, the cage element is fabricated as a formed sheet-metal part is designed in a manner that it exhibits a flange section designed as a contact surface with the spur gear, a cage wall section perforated by planet perforations, and a cage bottom. In an example embodiment, the cage element is fabricated from a sheet-metal blank in a drawing or press forming operation.

The forming operation in this case, for example, is implemented as a so-called hot-forming operation.

In an example embodiment, the gearing arrangement according to the invention is arranged in a manner that the sun gear is seated on a sun gear stud. The sun gear stud forms a first bearing seat on which a first gearing arrangement is seated that radially supports the cage element. This first bearing arrangement is, for example, configured as a rolling bearing, in particular as a four-point contact ball bearing, forming a fixed bearing that determines the axial position of the sun gear within the cage element.

In an example embodiment, the sun gear stud also forms a second bearing seat on which a second bearing arrangement is seated that supports the spur gear and the sun gear stud radially against each other. This bearing can in particular be configured as a needle bearing, in this case then forming a floating bearing.

In an example embodiment, the gearing arrangement according to the invention is configured in a manner that an additional bushing-type element, in particular a sliding sleeve carrier, is mated to a side of the spur gear facing away from the cage element. This sliding sleeve carrier can be fabricated as a formed sheet-metal part or as a solid part, and is, for example, designed so that the mating of the sliding sleeve carrier to the spur gear is achieved with the rivets employed for the cage element connection. In an example embodiment, the location of the bores designed to insert the rivets through the spur gear is selected such that the rivets are located on a pitch circle larger than the tip radius of the sun gear.

The sliding sleeve carrier forms a component of a shifting mechanism to selectively couple the spur gear with the sun gear stud. The shifting mechanism in addition to the sliding sleeve carrier has a sliding sleeve guided in axial direction in a displaceable manner on the sliding sleeve carrier.

The gearing arrangement according to the invention is particularly suited for manual transmissions, automated manual transmissions, direct manual transmissions, differential transmissions, coaxial transmissions, and automatic transmissions.

In an example embodiment of the invention, the sliding sleeve carrier is mated to the spur gear on the radial extent, or outside of the radial extent of the planet bearings. In this case, the sliding sleeve carrier is coupled to the spur gear with rivets. From a structural-mechanical point of view, a particularly advantageous mating of the sliding sleeve carrier and the cage element to the spur gear is achieved in this case by designing the sliding sleeve carrier, the cage element, and the spur gear with mutually complementary joining geometries, and by joining them with these joining geometries. These joining geometries are designed in a manner to achieve a sufficiently accurate position and location coupling and centering of the components already while the components are being assembled.

In an example embodiment, the shifting mechanism itself is configured in a manner that it comprises a synch-ring mechanism, by which the transmission element to be coupled with the sliding sleeve is initially appropriately synchronized during the shifting operation; the sliding sleeve is then axially shifted after the synchronized state has been achieved and can then be positively engaged with the associated counterpart.

In an example embodiment, the sliding sleeve carrier itself is configured in a manner that the axial length of the sliding sleeve carrier essentially corresponds to the axial length of the sliding sleeve. In an example embodiment, the sliding sleeve carrier is advantageously designed in a manner that the sliding sleeve carrier has axial teething in the area of its outer wall. In an example embodiment, the sliding sleeve carrier is fabricated as a formed sheet-metal, in particular configured as a drawn or wound part that is then welded along its butt joints.

In an example embodiment, the sliding sleeve is configured in a manner that it features interior teething complimentary to the aforementioned outer teething of the sliding sleeve carrier while guided in axial direction in a displaceable manner on the sliding sleeve carrier. In an example embodiment, the sliding sleeve is in turn fabricated as a formed sheet-metal part, as a machined part, or also as a casting, forging, or sintered part.

At its core, the invention relates to a planetary transmission unit on which a substitution of components and drive teething is achieved in favor of the part count and the manufacturing costs by directly mating the cage element to the spur gear and by employing rivet fastening technology. The solution concept according to the invention offers manufacturing advantages by reducing the part count, the part weight, and primarily the part complexity. Compared to conventional designs, in particular by eliminating previously required driver teething between the spur gear and planet carrier coupled to it and the sliding sleeve carrier, this results in a substantial cost reduction. Compared to conventional designs, the invention ultimately provides a more cost-effective design with a lower part count, reduced manufacturing costs, and simpler fastening technology. On the gearing arrangement according to the invention, the planet carrier is formed by a formed sheet-metal part on the one hand, and by the directly rivet-mounted spur gear on the other. This completely eliminates the conventionally inserted metal flange. The torque is transferred through the rivets or through the bores in the gear body of the spur gear to accommodate the planet pins. In addition, the synchronizer of the synchronization is also mated to the spur gear through the rivet connection. The driver teething conventionally employed for a torsion-resistant coupling are completely eliminated.

The gearing arrangement according to the invention is for example, characterized in that the planet carrier is comprised of a cage fabricated as a formed sheet-metal part and a segment of the spur gear onto which the cage is mounted. Furthermore, the bores to accommodate the planet pins are directly arranged in the spur gear body. The torsion-stiff coupling of the cage fabricated as a sheet-metal carrier with the spur gear body, as well as the mounting of the sliding sleeve carrier or synchronizer carrier, is accomplished by means of a riveted system comprised of the sheet-metal carrier, the spur gear, and the synchronizer carrier. The result is the elimination of a conventionally required planet carrier flange and the elimination of the previously required driver teething to engage with the planet carrier flange. In an example embodiment, the bearing of the sun gear is arranged with a needle bearing directly located in the spur gear and a four-point bearing in the rivet-mounted carrier flange. The gearing arrangement according to the invention results in a direct torque transfer between the planet carrier, the spur gear, and/or the synchronization by means of the component assembly according to the invention.

The gearing arrangement according to the invention represents an innovative solution for compact planetary transmissions with a more cost-effective torque transfer, while eliminating the previously conventional torque transfer with driver teething and the two-flanged embodiment of the planet carrier.

The invention creates a planetary transmission where the planet carrier is comprised of a riveted system with a spur gear body and a drawn sheet-metal part. Furthermore, the synchronization or the synchronizer is riveted-mounted onto the spur gear body. The torque is therefore transferred through the rivets; the driver teething employed in conventional designs and the sheet-metal carrier flange are eliminated. This results in a simplified construction with a reduced part count, reduced weight, and reduced costs.

BRIEF DESCRIPTION OF THE DRAWINGS

Various embodiments are disclosed, by way of example only, with reference to the accompanying drawings in which corresponding reference symbols indicate corresponding parts, in which:

FIG. 1 is a cross-sectional view of an example gearing arrangement.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1 shows a cross-sectional view of an example embodiment of a gearing arrangement according to the invention. This gearing arrangement comprises planetary stage G1, which as such comprises planet carrier C1 designed to rotate around transmission shaft X, planet gears P1 positioned in planet carrier C1, and at least one sun gear S1. The gearing arrangement furthermore comprises spur gear W1 to direct torque into planet carrier C1. Planet gears P1 are seated on planet pins B1. This bearing is accomplished herein by employing needle bearings.

Planet carrier C1 comprises cage element K fabricated as a formed sheet-metal part that is axially positioned onto spur gear W1 and fastened thereto. Planet pins B1 are radially supported in spur gear W1 in their end region facing spur gear W1, and are radially supported in cage element K in their end region facing away from spur gear W1.

Several bores 1 are arranged sequentially in circumferential direction in spur gear W1 and planet pins B1 are inserted into bores 1 from one side under an interference fit. Perforations 2 are also arranged in cage element K into which planet pins B1 are plunged with their particular end region under a pronounced interference fit. Cage element K is fastened to spur gear W1 with rivets 3.

The gearing arrangement is furthermore designed in a manner that sun gear S1 is seated on sun gear stud 4, sun gear stud 4 forms first bearing seat 4a on which first bearing arrangement L1 is located that radially supports cage element K.

Sun gear stud 4 also forms second bearing seat 4b on which second bearing arrangement L2 is located that supports spur gear W1 and sun gear stud 4 radially against each other. First bearing arrangement L1 acts as a fixed bearing and determines the axial position of sun gear S1 within planet carrier C1. This bearing arrangement is implemented herein as a four-point ball bearing.

On a side facing away from planetary carrier C1, sliding sleeve carrier 5 is mated to spur gear W1. The mating of sliding sleeve carrier 5 to spur gear W1 is accomplished with rivets 3 employed for the mating of cage element K. Rivets 3 are located on a pitch circle larger than the tip circle of sun gear S1.

Sliding sleeve carrier 5 forms a component of shifting mechanism SC to selectively couple spur gear W1 with sun gear stud 4. shifting mechanism SC in addition to sliding sleeve carrier 5 has sliding sleeve 6 guided in axial direction in a displaceable manner on sliding sleeve carrier 5, and sliding sleeve carrier 5 is mated to spur gear W1 on a radial extent located outside of the radial extent of the tip circle of the teething of sun gear S1.

Shifting mechanism SC is arranged in a manner that the axial displacement of sliding sleeve 6 can be accomplished by employing a shifting fork not shown in detail, where this shifting fork can engage into circumferential groove 6a of sliding sleeve 6 with shift fingers which are also not shown. Sliding sleeve 6 can herein be coupled with drive plate 7, which is coupled torsionally rigid with sun gear stud 4 through internally toothed fixing flange 8. Synchro-ring arrangement 9 is mounted onto the sliding sleeve 6 and the drive plate 7. Synchro-ring arrangement 9 forces sufficient synchronization of these components in a frictional manner before sliding sleeve 6 glides onto drive plate 7.

In the gearing arrangement shown here, the cage element K, spur gear W1 and the sliding sleeve carrier 5 form an axially tightly packed, intrinsically highly-rigid assembly, within which spur gear W1 also performs the single-sided seating function for planet pins B1. Planet gears P1 are axially secured in cage element K. In the gearing arrangement shown here, planet gears P1 engage radially from the interior into ring gear H1 only schematically indicated herein.

When sliding sleeve 6 is shifted left from the released position shown here, so that sliding sleeve 6 couples spur gear W1 and sun gear stud 4 in a rotationally fixed manner, the planetary transmission arrangement is intrinsically blocked and the torque applied on spur gear W1 is directly, e.g. without step-up function, transferred to ring gear H2. When sliding sleeve 6 is shifted into the shown released position and sun gear stud 4 is secured in a rotationally fixed manner, a step-up to fast mode is realized through the planetary gearing arrangement.

For the exemplary embodiment shown here, the planetary gearing arrangement is designed in a manner that comprises three or four planets P1 sequentially arranged in circumferential direction so that each engages into sun gear S1 and into ring gear H1. It is also possible to implement a so-called double planetary arrangement by means of the cage element according to the invention, where one planet each of a double planet pair engages into the sun gear and the other planet of this pair engages into ring gear H1. The planetary gearing arrangement then acts as a reversing transmission.

In a bearing arrangement not shown in detail herein, ring gear H1 can be seated on a section of sun gear stud 4 that axially extends beyond first bearing arrangement L1.

Cage element K is fabricated herein as a formed sheet-metal part. The cage element can also be fabricated as a forging, in particular as a die forging, as an extrusion, or also as a sintered part. The cage element comprises flange section K1 mated axially to the front face of spur gear W1, thus forming the head contact surfaces on which rivets 3 are seated. Cage element K furthermore comprises cage wall K2 perforated by planet perforations and particular cage bottom K3 where bores 2 are arranged. Cage element K is fabricated as a sheet-metal extrusion. The section of cage element K that accommodates first bearing arrangement L1 is also fabricated with forming technology. The inner diameter of the seating section of cage bottom K3 that accommodates bearing arrangement L1 is sized in a manner that sun gear stud 4 can be axially inserted into sun gear W1 from the side of cage element K after cage element K is secured to spur gear W1. After sun gear stud 4 is inserted into spur gear W1, bearing arrangement L1 is inserted and secured by spring washer 9 shown here for illustration.

In this exemplary embodiment, sliding sleeve carrier 5 is machined from solid stock. It is however also possible to fabricate sliding sleeve carrier 5 as a formed sheet-metal part.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A gearing arrangement, comprising:
   a planetary stage comprising:
   a planet carrier arranged to rotate around a transmission shaft;
   a plurality of planet pins, each planet pin comprising a first and second end region;
   a plurality of planet gears, wherein said plurality of planet gears are arranged on said plurality of planet pins, respectively, said plurality of planet pins arranged within said planet carrier; and,
   at least one sun gear;
   a spur gear arranged to direct torque into said planet carrier, wherein:
   said planet carrier comprises a cage element axially arranged on said spur gear; and,
   said plurality of planet pins are arranged within said spur gear and radially supported in said cage element with said respective first end regions arranged to face said spur gear and said respective second end regions arranged to face away from said spur gear.

2. The gearing arrangement recited in claim 1, wherein:
   said spur gear comprises a plurality of bores arranged sequentially in a circumferential direction in said spur gear; and,
   said plurality of planet pins is inserted into said plurality of bores from a first side.

3. The gearing arrangement recited in claim 2, wherein said plurality of planet pins is arranged within said bores with an interference fit.

4. The gearing arrangement recited in claim 2, wherein:
   said cage element is fabricated as a formed sheet-metal part; and,
   said cage element comprises perforations into which said plurality of planet pins are inserted.

5. The gearing arrangement recited in claim 1, further comprising:
   a plurality of rivets mating said cage element to said spur gear.

6. The gearing arrangement recited in claim 1, further comprising:
   a first bearing arrangement radially supporting said cage element by a cage bottom of said cage element, wherein:
   the planetary stage comprises at least one sun gear stud;
   said at least one sun gear is seated on said at least one sun gear stud;
   said at least one sun gear stud forms a first bearing seat on which the first bearing arrangement is arranged.

7. The gearing arrangement recited in claim 6, further comprising:
   a second bearing arrangement that supports said spur gear and said at least one sun gear stud radially against one another, wherein said at least one sun gear stud forms a second bearing seat on which the second bearing arrangement is arranged.

8. The gearing arrangement recited in claim 6, wherein said first bearing arrangement forms a fixed bearing.

9. The gearing arrangement recited in claim 6, further comprising:
   a sliding sleeve carrier mated to said spur gear and said cage element, said sliding sleeve carrier arranged to axially extend away from said spur gear.

10. The gearing arrangement recited in claim 9, further comprising:
    a plurality of rivets:
    securing said sliding sleeve carrier to said spur gear; and,
    securing said cage element to said spur gear, wherein:
    said plurality of rivets is arranged on a pitch circle larger than said at least one sun gear;
    said sliding sleeve carrier forms a shifting mechanism arranged to selectively couple said spur gear with said at least one sun gear stud;
    said shifting mechanism comprises a sliding sleeve guided in an axial direction in a displaceable manner on said sliding sleeve carrier; and,
    said sliding sleeve carrier is secured to said spur gear radially outside of said at least one sun gear.

11. A gearing arrangement, comprising:
    a planetary stage comprising:
    a planet carrier arranged to rotate around a transmission shaft;
    a plurality of planet pins, each planet pin comprising a first and second end region;
    a plurality of planet gears, wherein said plurality of planet gears are arranged on said plurality of planet pins, respectively, said plurality of planet pins arranged within said planet carrier; and,
    at least one sun gear;
    a spur gear arranged to direct torque into said planet carrier, wherein:
    said planet carrier comprises a cage element axially arranged on said spur gear; and, said plurality of planet pins are arranged within said spur gear and radially supported in said cage element with said respective first end regions arranged to face said spur gear and said respective second end regions arranged to face away from said spur gear;

a first bearing arrangement radially supporting said cage element by a cage bottom of said cage element, wherein:

the planetary stage comprises at least one sun gear stud;

said at least one sun gear is seated on said at least one sun gear stud;

said at least one sun gear stud forms a first bearing seat on which the first bearing arrangement is arranged; and, a second bearing arrangement that supports said spur gear and said at least one sun gear stud radially against one another, wherein said at least one sun gear stud forms a second bearing seat on which the second bearing arrangement is arranged.

12. A gearing arrangement, comprising:
a planetary stage comprising:
    a planet carrier arranged to rotate around a transmission shaft;
    a plurality of planet pins, each planet pin comprising a first and second end region;
    a plurality of planet gears, wherein said plurality of planet gears are arranged on said plurality of planet pins, respectively, said plurality of planet pins arranged within said planet carrier; and,
    at least one sun gear seated on a sun gear stud;
a spur gear arranged to direct torque into said planet carrier, wherein:
    said planet carrier comprises a cage element axially arranged on said spur gear; and,
    said plurality of planet pins are arranged within said spur gear and radially supported in said cage element with said respective first end regions arranged to face said spur gear and said respective second end regions arranged to face away from said spur gear; and;
a bearing arrangement arranged between said spur gear and said sun gear stud, said bearing arrangement radially supporting said spur gear and said sun gear stud against one another.

* * * * *